United States Patent [19]

Stickle et al.

[11] Patent Number: 4,738,713

[45] Date of Patent: Apr. 19, 1988

[54] METHOD FOR INDUCTION MELTING REACTIVE METALS AND ALLOYS

[75] Inventors: Donald R. Stickle, Tipp City; Shelby W. Scott, New Carlisle; Donald J. Chronister, Centerville, all of Ohio

[73] Assignee: The Duriron Company, Inc., Dayton, Ohio

[21] Appl. No.: 938,046

[22] Filed: Dec. 4, 1986

[51] Int. Cl.$^4$ ............................................. C22B 4/00
[52] U.S. Cl. ................................. 75/10.18; 75/10.14
[58] Field of Search ............................ 75/10.14, 10.18

[56] References Cited

U.S. PATENT DOCUMENTS

| | | | |
|---|---|---|---|
| 2,091,087 | 8/1937 | Wempe | 75/10.14 |
| 3,014,255 | 12/1961 | Bussard | 75/10.14 |
| 3,223,519 | 12/1965 | Schippereit | 75/10.14 |
| 3,598,168 | 8/1971 | Clark | 75/10.18 |
| 3,775,091 | 11/1973 | Clites | 75/10.18 |
| 4,058,668 | 11/1977 | Clites | 13/32 |

OTHER PUBLICATIONS

Cold—Crucible Induction Melting of Reactive Metals—G. H. Schippereit, A. F. Leatherman & D. Evers, Feb. 1961—Journal of Metals.
Induction Heating Process for Melting Titanium—Research & Technology Division—United States Air Force—Technical Documentary Report No. ML TDR 64—209—Jul. 1964.
Preparation of Ingots and Shaped Castings by Inductoslag Melting—P. G. Clites & R. A. Beall—Oct. 16-18, 1974—Fifth International Symposium on Electroslag and Other Special Melting Technologies.
The Inductoslag Melting Process—Bulletin 673—P. G. Clites—United States Department of the Interior.
Inductoslag Melting of Titanium—P. G. Clites & R. A. Beall—Report of Investigation 7268—United States Department of Interior—Jun. 1969.
Letter from Phil Clites to Don Stickle—Jul. 14, 1986.

Primary Examiner—Peter D. Rosenberg
Attorney, Agent, or Firm—St. Onge Steward Johnston & Reens

[57] ABSTRACT

A method for melting a charge of reactive metals or metal alloys is disclosed in which the charge is induction melted in a segmented crucible in the absence of insulating slag, under a non-reactive environment utilizing an induced alternating current.

7 Claims, 1 Drawing Sheet

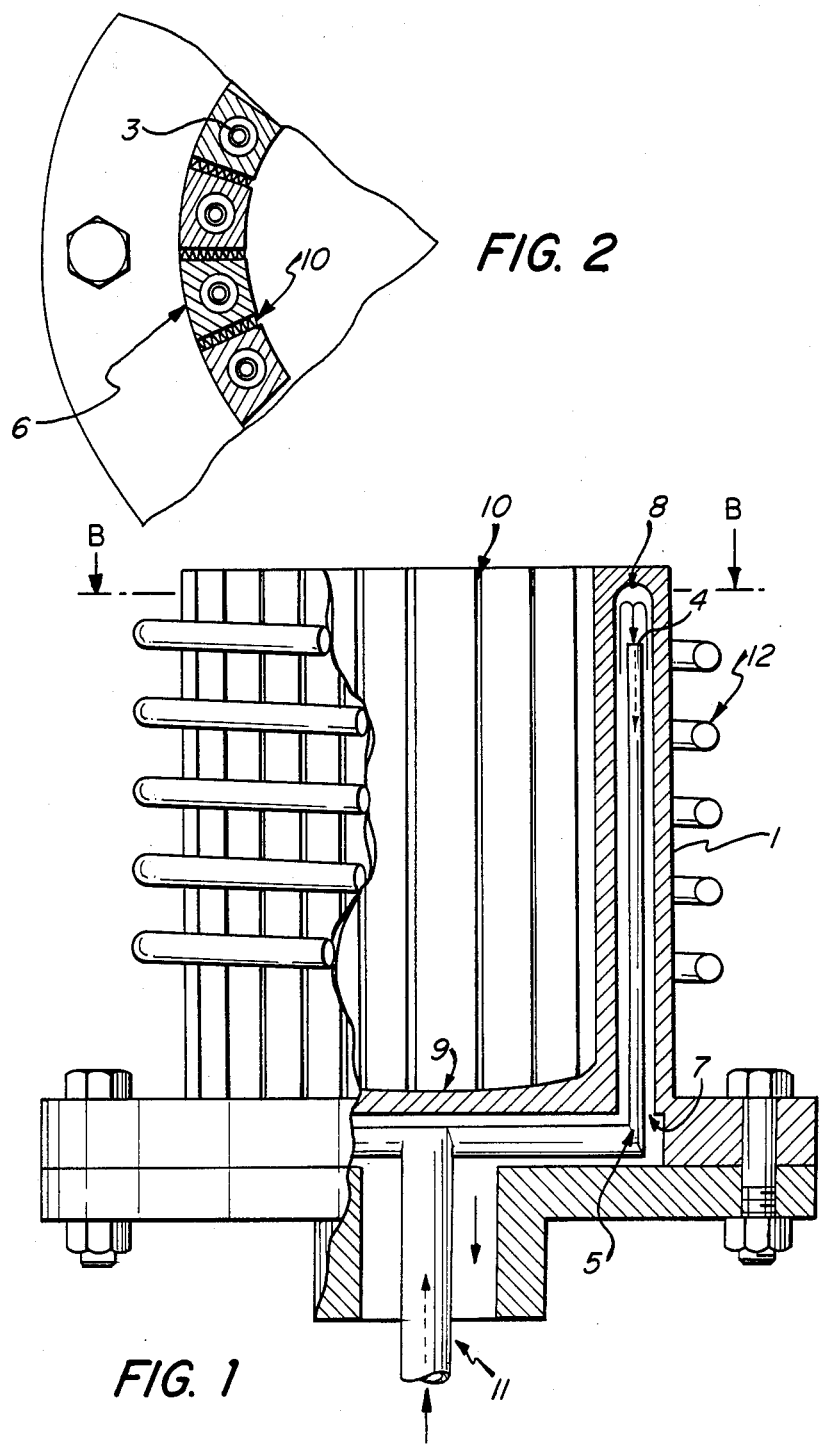

METHOD FOR INDUCTION MELTING REACTIVE METALS AND ALLOYS

BACKGROUND OF THE INVENTION

The present invention relates to the induction melting of reactive metals and alloys in water cooled metal crucibles.

As is set forth in G. H. Schippereit, et al, "Cold Crucible Induction Melting of Reactive Metals," *Journal of Metals*, February 1961, pages 140-143 and in Schippereit's U.S. Pat. No. 3,223,519 of Dec. 14, 1965, the art for some time has recognized the theoretical desirability of utilizing induction heating methods for the melting of reactive metals such as titanium, as a replacement for known industrial scale melting processes based up, e.g., consumable electrode arc melting techniques. In induction melting, an electric current is induced into the metal to be melted. Thus, by supplying an alternating current to a primary induction coil, a reverse alternating current is induced into any electrical conductor lying within the magnetic field of the coil and produces heating in the conductor.

In induction melting, a crucible is needed to contain the molten pool which forms from the metallic charge which lies within the magnetic field of the coil. In most induction melting processes, the crucible is formed of a refractory material such as aluminum oxide. However, reactive metals, including titanium, zirconium, hafnium, molybdenum, chromium, niobium, and other metals and alloys of this type cannot be melted successfully in refractory crucibles. When molten, these metals react with and dissolve the crucibles causing the molten metal to become contaminated. This problem is avoided in a cold-mold arc-melting furnace because the crucible, usually copper, is cooled to avoid temperature sufficiently high for reaction to occur with the enclosed reactive metal. Copper is preferred for such cold crucibles to provide good thermal and electrical conductivity and thermal shock resistance. However, early attempts to induction melt reactive metals in water-cooled metal crucibles were unsuccessful. In such cases, the primary coil surrounding the crucible induced strong electrical currents in the crucible which led to insufficient power transfer to the metal charge held within the crucible to initiate melting.

In response to these problems, Schippereit proposed a low frequency, coreless induction melting process in which the metal charge is held in a metal crucible which is "segmented", i.e., constructed of metal segments electrically insulated from one another by a non-conductive material (e.g., thin plastic, ceramic). In this way induced currents generated from a surrounding induction coil could not flow in a continuous manner circumferentially around the crucible, thereby minimizing attenuation of the magnetic flux intended for establishing induction currents in, and melting, the charge held by the crucible, and preventing damage to the crucible and/or alloying of crucible metal with charge metal.

A large effort was made to reduce the segmented cold-wall induction melting concept proposed by Schippereit to commercial practice for melting reactive metals including titanium. This work is reported in "Induction Heating Process for Melting Titanium", MLTDR 64-209, July 1964, Contract AF 33(600)-39039. The process was generally unsuccessful and was abandoned.

In U.S. Pat. No. 3,775,091 to Clites, et al of Nov. 27, 1973, it was pointed out that the induction process and apparatus of Schippereit, while successful on small scale equipment, could not be scaled up for use in large crucibles. According to Clites, et al, as the metal charge melted in the Schippereit process, molten metal filled the interruptions in the crucible segments, thus shorting the segments together and returning to the undesirable situation where induction currents were established in the crucible.

The solution to this problem as proposed by Clites, et al, was to generally retain the segmented crucible concept but to use a slag or fluxing agent in association with the metal charge in order to produce a self-generating and self-renewing insulting material between the crucible segments and provide a liner for the interior crucible surface. In addition to changing the melt process advocated by Schippereit, Clites later modified the crucible design itself. In Clite's later crucible design, the side segments of the crucible were no longer electrically insulated from each other but rather were electrically connected at the base of the crucible. Besides U.S. Pat. No. 3,775,091, other descriptions of this "inductoslag" melting or casting process may be found in U.S. Pat. No. 4,058,668 and in P. G. Clites et al, "Preparation of Ingots and Shaped Castings by Inductoslag Melting", Proceedings of the Fifth International Symposium on Electroslag and Other Special Melting Technologies, Oct. 16-18, 1974; Bulletin 673, "The Inductoslag Melting Process," U.S. Department of the Interior, Bureau of Mines (1982); and Bureau of Mines, Report of Investigations, RI 7268, "Inductoslag Melting of Titanium" (1969), all of which are incorporated by reference herein.

While the "inductoslag" melting process developed by Clites has been discussed in the prior art as having at least theoretical applicability to the melting of a variety of reactive metals and their alloys, our work with this system encountered significant problems. First, the use of slag in melting reactive metals has never been commercially accepted due to the concern for property degradation as a result of slag contamination of the metal. Second, melting and casting under the preferred conditions for "inductoslag" processing—i.e., under a partial pressure of argon or helium—did not produce castings of satisfactory quality for commercial purposes. By conducting the process under vacuum we were able to eliminate the casting quality shortcomings of the inert gas system. However, operation under vacuum introduced new problems not previously encountered or mentioned in the literature. Specifically, the slag underwent vaporization from the melt under the vacuum levels needed to produce quality castings. The vaporization formed extensive deposits throughout the melt furnace, and these deposits severely contaminated the vacuum system, including the vacuum pumps. Under certain conditions these deposits reacted with the molten metal and caused extensive gas porosity in castings. Under all conditions, the vaporization of slag extracted heat from the molten metal bath and significantly reduced the amount of metal that could be poured from the crucible into the casting mold.

SUMMARY OF INVENTION

In view of the foregoing, it is an object of the present invention to provide a method for melting reactive metals by means of induction heating.

A further object of the invention is to provide a method for induction melting of reactive metals to form a molten pool thereof for the formation of castings, ingots and the like.

Yet another object of the invention is to provide a method for induction melting of reactive metals in a metal crucible without use of insulating slag material so as to form a molten pool of the reactive metals suitable for use in production of castings, ingots and the like.

Still a further object of the invention is to provide an induction melting process of the type noted which can be conducted under conditions of substantial air exclusion to produce metal melts capable of use in producing quality castings, ingots and the like, yet which process is unattended by processing and other problems heretofore encountered in the art.

According to the present invention it was surprisingly found that melting of reactive metals could be accomplished by means of an induction melting process using a segmented conductive metal crucible constructed according to the teaching of Clites, et al, in a nonreactive atmosphere, by completely eliminating the deliberate use of slag from the process. Notwithstanding the teachings of the prior art, it was found that elimination of the slag under these conditions did not lead to shorting together of the separated crucible segments to a degree which would significantly adversely affect the efficiency of the induction melting process.

The process of the present invention comprises a method for the induction melting of reactive metals and alloys. According to the process, a crucible chamber is provided which comprises a hollow, elongated cylindrical metal structure of generally uniform cross section throughout its length, the side walls of which are divided into at least two segments by slits running substantially the length of the crucible except at the base where the segments are electrically joined. The crucible differs from that defined in the Schippereit patent in that the wall segments are not electrically insulated from each other but rather are electrically shorted where the segments are formed together in a common base. The crucible is provided with means for cooling its outside surfaces, and at least the upper portion thereof is surrounded by a primary induction coil. A charge of reactive metal is introduced and confined within the crucible chamber and is there heated to form a molten pool by supplying an alternating current to the primary induction coil, thereby subjecting the charge metal to an induced alternating current flux sufficient to effect melting. The melting process is conducted in the absence of any deliberate slag material additions and under vacuum or inert gas atmospheres. The molten pool of metal formed may be used to produce a variety of useful products, and most preferably a product selected from the group consisting of castings, ingots, powders, foils, flakes, fibers, crystals and granular material.

This process differs from previous art in this area in several respects. The process differs from the Schippereit work in that the crucible construction is varies. Thus, the wall segments of the crucible in the present invention are not electrically insulated from each other as in the Schippereit work but rather are joined together in a common base. The process differs from the Clites process in that no insulating slag is used or needed to prevent attenuation of the power in the crucible.

BRIEF DESCRIPTION OF THE DRAWINGS

FIG. 1 is a longitudinal cross sectional view of a crucible useful in the present invention for the melting of reactive metals.

FIG. 2 is a cross section taken along B—B of FIG. 1.

DETAILED DESCRIPTION OF THE INVENTION

The crucible chamber utilized in the present invention may be of the general type known in the art (see, e.g., Clites, et al, U.S. Pat. Nos. 3,775,091 and 4,058,668). A crucible of the type described in U.S. Pat. No. 4,058,668 is shown in FIGS. 1 and 2. The chamber is constructed in cylindrical hollow form from metal material having high heat conductivity, such as copper. Upstanding side wall (1) is formed by a circular row of upstanding concentric tube pairs, each pair consisting of an inner tube (3) which is open at both its upper (4) and lower (5) ends and an outer tube (6) which has an open lower end (7) and a closed upper end (8). The upper end (4) of the inner tube terminates below the closed end of the outer tube (8) so that cooling water in one of the tubes can flow freely into the other tube. The outer tubes (6) are affixed in a base member (9) which serves to support the wall segments and electrically connect each outer tube (6). Each outer tube (6) is separated from the adjacent outer tube by a non-conducting, higher temperature refractory or similar high temperature insulating product (10) which runs from the top of the crucible to the base. Cooling water is flowed through the inner tube (3) and out the outer tube (6). A manifold (11) is used to deliver and return the cooling water to the crucible.

The crucible is surrounded by a work coil (12) which in turn is connected to a suitable power source (not shown). The work coil and crucible may be further surrounded by a cooling jacket (not shown) and/or cooling fluid (e.g., water) may be flowed through the work coil. The work coil (12) will generally be made of copper tubing.

In operation the crucible is completely enclosed in an airtight chamber having provision for evacuation of air down to 500 microns pressure or lower. The chamber will be designed to permit melting, charging, and pouring of metal to be performed from outside the airtight chamber.

In the process of the invention, the crucible is arranged in the airtight chamber, the chamber is evacuated to below 500 microns pressure, and the cooling water circulation about the crucible started. Depending upon the final use of the metal, the chamber may be left under vacuum or backfilled with an inert gas to a pressure under one atmosphere. Reactive metal in any suitable physical form and proportions which were not charged to the crucible prior to initial evacuation of the chamber are added through a suitable feed mechanism, and power supplied to the work coil. No insulating slag material is caused to be present in the crucible during the melting process, although certain minor impurities may of course be introduced via the charges of metal. Heating by means of the work coil proceeds to establish a molten pool of metal. Additional metal may be charged intermittently. Metal may be held in the molten conditions to obtain better uniformity, to dissolve unwanted impurities, or for similar reasons once a molten pool is obtained.

After the melting practice is completed, the molten metal available may be used to make products such as ingots, castings, powders, foils, flakes, fibers, crystals, and granular materials.

The following working examples serve to illustrate the process of the invention.

EXAMPLE 1

A crucible 8" in diameter by 8" in height constructed similarly to the crucible defined in FIGS. 1 and 2 was placed inside a working coil inside an airtight chamber. Twenty pounds of a titanium alloy, Titanium-6 Aluminum-4 Vanadium, was charged to the crucible in the form of 2" by 2" bars. The chamber was subsequently pumped down to a pressure of 38 microns and power applied to the coil. After 16 minutes at a power input of 260 KW a melt was formed. This melt was held for 5 minutes at which time the metal was poured from the crucible into an investment mold. The pressure in the melt chamber at pouring was 47 microns

EXAMPLE 2

The same crucible described in Example 1 was placed inside a working coil inside an airtight chamber. Twenty-six pounds of titanium, 12 pounds of an aluminum-columbium master alloy, 3 pounds of a vanadium-aluminum master alloy, and 3 pounds of a molybdenum-aluminum master alloy were added to the crucible. The chamber was then pumped down to below 50 microns pressure, followed by a backfill with argon gas to a pressure of 132 torr. Initially 120 KW of power was applied to the coil. Power was gradually increased to 300 KW. Thirteen minutes after power was applied to the coil, a complete melt was obtained. At this point, two pounds of aluminum were added and the melt held for an additional 5 minutes. After this period, power was shut off to the coil and the melt permitted to solidify in the crucible.

The process of the present invention is, as noted, suitable for induction melting and subsequent casting of a variety of reactive metals. These metals include titanium, zirconium, hafnium, chromium, niobium, tantalum, molybdenum, uranium, rare earth metals and thorium, as well as alloys of these metals with other metals, in which alloys the reactive metal constitutes a sufficiently significant portion thereof so as to have the capability, absent use of the process of the present invention, of leading to earlier-noted problems in the induction melting process by reason of inherent reactivity.

A key feature of the invention process is elimination of need for utilization of insulating slag material during the induction melting process, thereby eliminating from the process materials which might contaminate the molten metal pool and which would preclude operation of the process under conditions of air evacuation required to produce quality metal castings, ingots, powders, etc. As earlier noted, the metals or alloys charged to the melting process may contain inherent impurities depending on the source thereof, but these impurities are by no means required to be present in order for the process to function and, indeed, would desirably not be present at all. Accordingly, when reference is made to the process herein being conducted in the "absence of insulating slag materials", such language is intended to exclude the presence of deliberately-added slag (i.e., for the believed-functional purpose of the prior art), but is not intended to exclude from the process the utilization of metal charges which may inherently contain, as impurities, inorganic slag-like materials.

Another important feature of the present invention is the utilization of a metal crucible for holding of the charge during the melting process, rather than use of a crucible made of refractory material. In this way, there is eliminated the pronounced tendency of the reactive metals to dissolve and become contaminated by refractory material. As noted, however, the metal crucible permissibly may contain refractory or other insulating material as filling for the slits used to separate the metal segments forming the crucible above the base member (where the "segments" are deliberately electrically connected). Hence, reference herein to a "metal" crucible is intended to convey the fact that the essential inner working surface of the crucible is made of conductive metal (preferably copper) notwithstanding the fact the non-conductive, insulating material may also be present in the minor amounts used for filling of the longitudinal separating slits between metal segments.

Yet another important feature of the invention is the substantial evacuation of air during the melting process, attained by evacuation of air from the airtight chamber in which the crucible is enclosed for the melting process (down to at least about 500 microns of pressure), followed, optionally, by "replacement" of the vacuum (i.e., back-filling of the chamber) with an inert gas.

The particular amount of power supplied to the work coil surrounding the crucible is not critical per se, being simply that sufficient to induce in the metal charge, held by the crucible, an induced current effective to achieve complete melting of the charge. Thus, the particular quantity of power supplied will be dependent upon the metals to be melted, the type induction coil, and other like considerations.

The foregoing description is provided for purposes of explaining to those of skill in the art the essential features of the invention and particular illustrative materials and conditions for use therein. Obviously, the particular details provided may be varied as needed for particular melting processes and other variations and embodiments may be arrived at without departing from the spirit of the invention, the scope of which is defined by the appended claims.

What is claimed is:

1. A method for induction melting a reactive metal charge in order to provide a molten metal pool for producing castings, ingots, and other products, comprising the steps of:
   (a) providing a crucible chamber comprised of a hollow, elongate metal structure, the elongate metal side walls of which are comprised of and made up by at least two elongate metal side wall segments, each such segment being spaced apart from any adjacent segment but all such segments nevertheless being in electrical interconnection, said crucible chamber being provided with means for cooling its outside surfaces, and at least a portion of said crucible chamber being surrounded by a primary induction coil;
   (b) arranging said crucible chamber in a closed environment evacuated to remove air to a pressure less than about 500 microns;
   (c) introducing into said crucible chamber a charge comprised of reactive metal in the absence of any intentionally added insulating slag materials such that during the melting of such charge in said crucible chamber no insulating slag layer is formed;

(d) subjecting said metal charge to an alternating current flux induced by an alternating current supplied to said primary induction coil; and (e) maintaining said alternating current flux, while cooling the outer surfaces of said crucible chamber, to melt the charge and heat the molten pool in said chamber.

2. The method according to claim 1 wherein said reactive metal charge consists of a titanium alloy.

3. The method according to claim 1 wherein said reactive metal charge comprises a metal selected from the group consisting of zirconium, hafnium, chromium, niobium, tantalum, molybdenum, uranium, rare-earth metals, thorium, and alloys thereof.

4. A method for induction melting of a reactive metal charge in order to provide a molten metal pool for production of parts therefrom, comprising the steps of:

(a) providing a crucible chamber comprised of a hollow, elongate metal structure, the elongate metal side walls of which are comprised of and made up by at least two elongate metal side wall segments, each such segment being spaced apart from any adjacent segment but all such segments nevertheless being in electrical interconnection, said crucible chamber being provided with means for cooling its outside surfaces, and at least a portion of the length of said crucible being surrounded by a primary induction coil;

(b) arranging said crucible chamber in a closed environment evacuated to remove air to a pressure less than about 500 microns;

(c) introducing into said crucible chamber a charge comprised of reactive metal, with the charge being essentially free of insulating slag materials, the composition of such charge of reactive metal remaining essentially slag-free and being such that there is present in said crucible, after induction melting, a pool of molten metal comprised of materials selected from the group consisting of titanium alloy, zirconium, hafnium, chromium, niobium, tantalum, molybdenum, uranium, rare-earth metals, thorium, alloys of zirconium, hafnium, chromium, niobium, tantalum, molybdenum, uranium, rare-earth metals and thorium with each other or with other metals, and mixtures thereof;

(d) subjecting said metal charge to an alternating current flux induced by an alternating current supplied to said primary induction coil; and (e) maintaining said alternating current flux, while cooling the outer surfaces of said crucible chamber, to melt the reactive metal charge and to heat the molten pool in said crucible chamber.

5. The method according to claim 1 or 4 wherein, prior to the subjecting of said metal charge to said alternating current flux, said vacuum is replaced with an inert gas atmosphere selected from the group of gases consisting of argon, helium, neon, and krypton.

6. The method according to claims 1 or 4 wherein said products made from said molten pool are selected from the group consisting of ingots, castings, powders, foils, flakes, fibers, crystals, and granular materials.

7. The method according to claim 4 wherein said charge consists of a titanium alloy.

* * * * *

REEXAMINATION CERTIFICATE (2172nd)

United States Patent [19]

Stickle et al.

[11] B1 4,738,713

[45] Certificate Issued    Jan. 4, 1994

[54] METHOD OF INDUCTION MELTING REACTIVE METALS AND ALLOYS

[75] Inventors: Donald R. Stickle, Tipp City; Shelby W. Scott, New Carlisle; Donald J. Chronister, Centerville, all of Ohio

[73] Assignee: Duriron Company, Inc.; Dayton, Ohio

Reexamination Requests:
No. 90/002,055, Jun. 15, 1990
No. 90/002,501, Nov. 7, 1991

Reexamination Certificate for:
Patent No.:   4,738,713
Issued:       Apr. 19, 1988
Appl. No.:    938,046
Filed:        Dec. 4, 1986

[51] Int. Cl.$^5$ .............................................. C22B 4/00
[52] U.S. Cl. .................................. 75/10.18; 75/10.14; 373/140; 373/156; 373/158
[58] Field of Search ....... 75/10.18; 373/140, 156–158; 266/275

[56]            References Cited
U.S. PATENT DOCUMENTS

| | | | |
|---|---|---|---|
| 3,520,980 | 7/1970 | Sterling et al. | 373/140 |
| 3,702,368 | 11/1972 | Hukin | 373/156 |
| 4,058,668 | 11/1977 | Clites | 13/32 |

FOREIGN PATENT DOCUMENTS

| | | |
|---|---|---|
| 518499 | 2/1931 | Fed. Rep. of Germany. |
| 2717459 | 11/1978 | Fed. Rep. of Germany. |
| 1186806 | 4/1970 | United Kingdom. |

OTHER PUBLICATIONS

"Techniques of Materials Preparation and Handling Part 2", 1968, pp. 781–789 of Techniques of Metals Research, vol. 1, Part 2, published by Interscience Publishers.

"H.C.C. 50 Cold Crucible" brochure of Crystalox Ltd. (published 1974).

"HCC 50 Cold Crucible" brochure of Crystalox Ltd. (published 1983).

"HCB 150 Cold Boat" brochure of Crystalox Ltd. (published 1983).

L.L. Tir and N.I. Fomin, "Modern Methods of Induction Smelting" [in Russian], Energiya, Moscow (1975) with translation Nikiforara, Pavlov, Tir, "Calculation of Electromagnetic, Hydrodynamic, and Energy Characteristics of Induction Furnace with Cold Crucible" Magnitnaya Gidrodinamika, No. 2, pp. 101–110 Apr./June 1984 (published translation)

*Primary Examiner*—Peter D. Rosenberg

[57]            ABSTRACT

A method for melting a charge of reactive metals or metal alloys is disclosed in which the charge is induction melted in a segmented crucible in the absence of insulating slag, under a non-reactive environment utilizing an induced alternating current.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4 are determined to be patentable as amended.

Claims 2, 3, 5, 6, and 7, dependent on an amended claim, are determined to be patentable.

1. A *cold crucible induction skull melting* method for induction melting a reactive metal charge in order to provide a molten metal pool for producing castings, ingots and other products, comprising the steps of:
   (a) providing a crucible *having a* chamber *within which to confine and melt a reactive metal charge*, said crucible chamber being comprised of a *vertically-oriented*, hollow, elongate *cylindrical* metal structure *of generally uniform cross-section throughout its length*, the elongate metal side walls of which are comprised of and made up by at least two *upstanding* elongate metal side wall segments, each such segment being spaced apart from any adjacent *side wall* segment but all such *side wall* segments nevertheless being in electrical interconnection, *such that said side wall segments are not electrically insulated from each other but rather are electrically shorted where said side wall segments are connected together but are not shorted to a degree which would significantly adversely affect the efficiency of the induction melting process*, said crucible chamber being provided with means for cooling its outside surfaces, and at least a portion of said crucible chamber being surrounded by a primary induction coil;
   (b) arranging said crucible chamber in a closed environment evacuated to remove air to a pressure less than about 500 microns;
   (c) introducing into said crucible chamber a charge comprised of reactive metal in the absence of any intentionally added insulating slag materials such that during the melting of such charge in *contact with* said crucible chamber no insulating slag layer is formed;
   (d) subjecting said metal charge *in said crucible chamber* to an alternating current flux induced by an alternating current supplied to said primary induction coil; and
   (e) maintaining said alternating current flux, while cooling the outer surfaces of said crucible chamber, to melt the charge and heat the molten pool in said chamber.

4. A *cold crucible induction skull melting* method for induction melting of a reactive metal charge in order to provide a molten metal pool for production of parts therefrom, comprising the steps of:
   (a) providing a crucible *having a* chamber *within which to confine and melt a reactive metal charge, said crucible member being* comprised of a *vertically-oriented*, hollow, elongate cylindrical metal structure *of generally uniform cross-section throughout its length*, the elongate metal side walls of which are comprised of and made up by at least two *upstanding* elongate metal side wall segments, each such segment being spaced apart from any adjacent *side wall* segment but all such *side wall* segments nevertheless being in electrical interconnection, *such that said side wall segments are not electrically insulated from each other but rather are electrically shorted where said side wall segments are connected together but are not shorted to a degree which would significantly adversely affect the efficiency of the induction melting process*, said crucible chamber being provided with means for cooling its outside surfaces, and at least a portion of the length of said crucible *chamber* being surrounded by a primary induction coil;
   (b) arranging said crucible chamber in a closed environment evacuated to remove air to a pressure less than about 500 microns;
   (c) introducing into said crucible chamber a charge comprised of reactive metal, with the charge being essentially free of insulating slag materials *such that during the melting of such charge in contact with said crucible chamber no insulating slag layer is formed*, the composition of such charge of reactive metal remaining essentially slag-free and being such that there is present in said crucible *chamber*, after induction melting, a pool of molten metal comprised of materials selected from the group consisting of titanium alloy, zirconium, hafnium, chromium, niobium, tantalum, molybdenum, uranium, rare-earth metals, thorium, and alloys of zirconium, hafnium, chromium, niobium, tantalum, molybdenum, uranium, rare-earth metals and thorium with each other or other metals, and mixtures thereof;
   (d) subjecting said metal charge *in said crucible chamber* to an alternating current flux induced by an alternating current supplied to said primary induction coil; and
   (e) maintaining said alternating current flux, while cooling the outer surfaces of said crucible chamber, to melt the reactive metal charge and to heat the molten pool in said crucible chamber.

* * * * *